United States Patent [19]
Nichols

[11] 3,800,157
[45] Mar. 26, 1974

[54] WEB INSPECTION APPARATUS

[75] Inventor: Gordon W. Nichols, Binghamton, N.Y.

[73] Assignee: GAF Corporation, New York, N.Y.

[22] Filed: Nov. 28, 1972

[21] Appl. No.: 310,144

[52] U.S. Cl.............................. 250/353, 250/341
[51] Int. Cl............................................. B01t 1/16
[58] Field of Search ... 250/83.3 H, 83.3 D, 219 DF, 250/341, 353

[56] References Cited
UNITED STATES PATENTS
3,589,816  6/1971  Sugaya.......................... 250/219 DF
3,566,121  2/1971  Myers........................... 250/219 DF Primary Examiner—Archie R. Borchelt
Assistant Examiner—Davis L. Willis
Attorney, Agent, or Firm—W. C. Kehm; S. B. Leavitt

[57] ABSTRACT

An infrared radiance measuring apparatus employed to measure defects in a moving continuous web substrate. A series of line filament lamps are in circuit relationship with a single channel photo detector and a signal amplifier as well as a photo transistor with a voltage follower to enable the radiance from the lamps to modulate in response to defects in the substrate being monitored. The instantaneous changing voltage as measured in response to an instantaneous change of light is noted on a suitable recording device.

4 Claims, 4 Drawing Figures

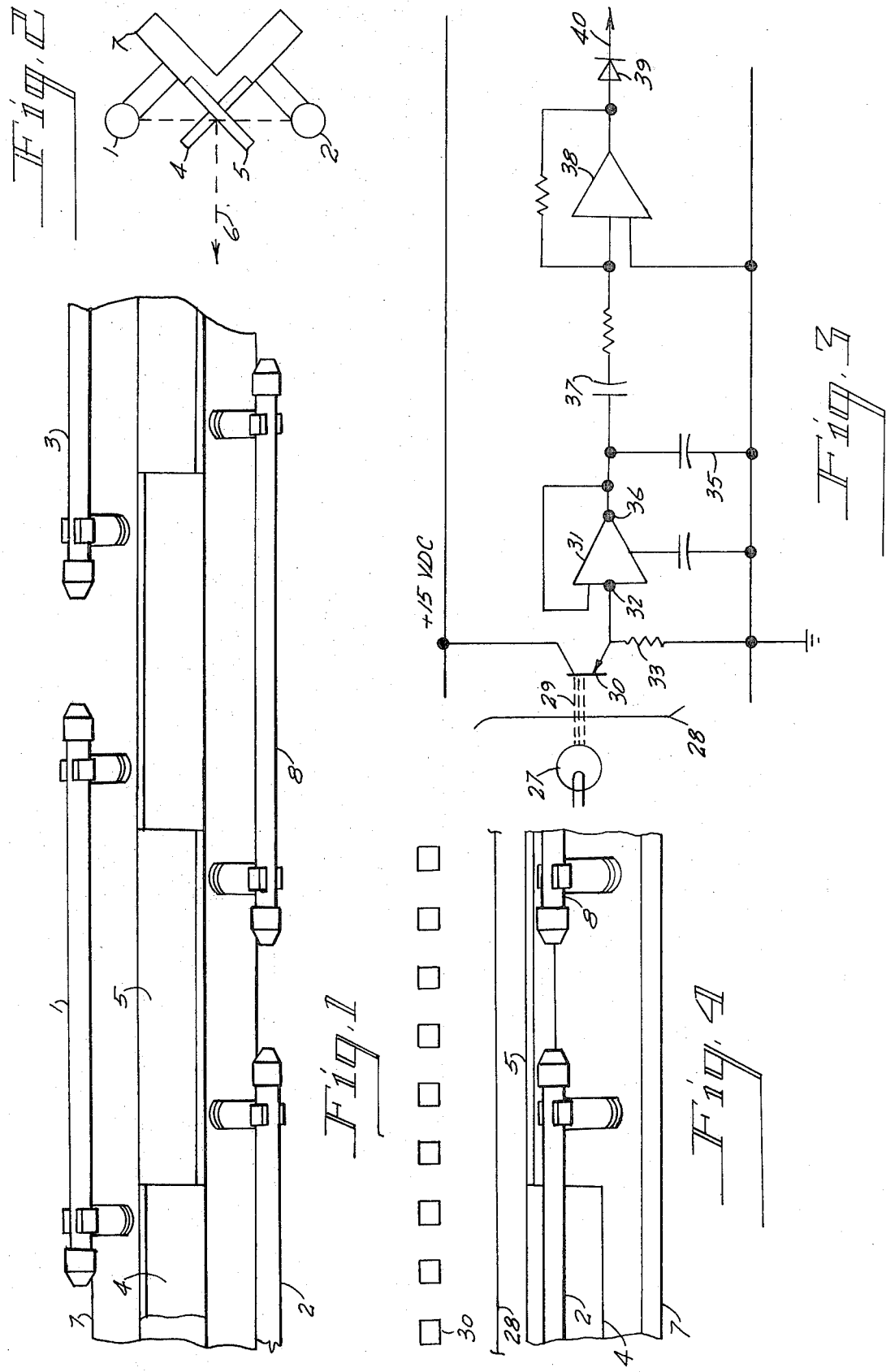

WEB INSPECTION APPARATUS

The present invention is directed to method and apparatus employed in the inspection of film during the manufacturing operation.

More particularly, the present invention is directed to the nondestructive testing of film to enable the detection of minute defects in the film.

One of the major problems in the inspection operation during the manufacture of photographic film and paper, resides in the steps of inspecting for flaws. The arrangement and apparatus for providing complete inspection of the film and/or paper without in any manner passing and failing to detect any of the defective material is quite important. In this connection, three different approaches have been utilized by the prior art in accomplishing this task.

For example, the use of a flying spot scanner technique is quite commonplace for the above mentioned purposes. With this arrangement a spot of light is directed to scan very rapidly accross the web of material as it moves in a given course of travel at right angles to the scanning apparatus. The reflected or transmitted light modulated by any surface irregularities or discontinuity is collected by a spherical mirror and focused on the cathode of a photo multiplier tube. The rate of scan is so fast that it is possible to have scan overlap and thus provide 100 percent coverage. This method can be used with a neon-helium lazer as a light source. A more detailed explanation in this respect is disclosed in U.S. Pat. No. 3,510,665.

Another method of inspection resides in providing a continuous line of light across the web or webs of material and to electronically scan by means of a television type of system using a Vidicon or silicon matrix tube.

A third method employed in quality control technique is to provide a continuous line of light across the web or webs of material and to employ a multiplicity of photo cells. In this arrangement, each one of such cells monitors a small pre-selected and designated area of the web while collectively providing 100 percent coverage. The term "light" in this connection may be and is generally inferred to mean infra-red radiance; that is, invisible to the human eye and at a wave length that will not expose the photographic material being detected. (800 to 1000 nanometers)

The present invention is directed to the last two of the aforementioned approaches for the testing of film during the manufacturing operation or the detection of minute defects in the film material.

By way of background, the present invention contemplates the creation of an unbroken single line of light of any desired length by employing a multiplicity of line filament lamps of a sufficient length to cover a complete width of film. Up to the present time, it has been commonplace to use a single custom lamp to achieve the same end result. However, with such single lamps and the present state of the art, line filaments in commercially available lamps are limited to a usable filament length of about 12 inches. A serious disadvantage with filaments of this length is the fact that spurious signals from the photo-detector are generated as a result of the tendency for such filaments to vibrate. Another serious disadvantage resides in the fact that the overall length of such lamps is typically 14 to 16 inches making it virtually impossible to place them in end-to-end relationship to form a continuous line of light.

It is known that a fluorescent tube can be used as a line of light by operating the lamp on direct current to eliminate pulsations, and by masking the tube longitudinally to create a line aperture. The color of the fluorescent light depends on the internal phosphor used, and the colors include various shades of white, and colors such as pink, green, and blue. The fluorescent tube methods work reasonably well if the material being inspected for defects is not sensitive to white or colored light. However, most photographic films today are panchromatic in nature, being sensitive to all visible light. The only means of non-destructive testing is infra-red radiance. The fluorescent tube has no useful infra-red emission, and therefore cannot be used on most photographic materials.

It is the main object of the present invention to provide a method and apparatus for continuous line of light of non-destructive film testing free from the defects of the prior art.

It is still another object of the present invention to provide a line of light testing apparatus capable of providing maximum modulation of the light by the smallest defect in the film.

Still another object of the present invention is to provide an apparatus capable of generating a single line of light by means of a series of small filament lamps.

Still another object of the present invention is to provide a means for reflecting the line of light from each individual lamp with surface mirrors alternately mounted at 45° to thereby form a continuous line.

With the foregoing and other objects in view, there is provided in accordance with the invention an improved radiance measuring apparatus adapted to measure the transmissivity of a moving substrate with infrared radiance, employing a series of line filament lamps, the infrared radiance from said lamps, modulates in response to defects in the substrate being monitored, wherein: each of said lamps are in cooperative relationship with front surface mirrors, being alternately mounted with respect to said lamps at 45° forming a continuous line of light of a length equal to the width of the moving substrate.

The present invention contemplates an alternate array of lamps and mirrors in circuit relationship with a plurality of one-channel photo detectors and signal amplifiers; said photo detectors being responsive to light impinging thereon, as said substrate of moving material passes between said detectors and said source of light; enabling an instantaneous change in voltage to be measured electrically in response to an instantaneous change of light caused by a defect in said substrate.

The construction and operation of the invention, however, together with additional objects and advantages will be best understood from the following description of specific embodiments when read in connection with the figures of the accompanying drawings showing the apparatus in accordance with the invention.

In the drawings:

FIG. 1 illustrates a top view of several lamps in an array constituting the present invention.

FIG. 2 illustrates a top sectional view of FIG. 1.

FIG. 3 illustrates a schematic representation of one portion of the same circuit in the present invention depending upon the number of photo detectors being employed.

FIG. 4 illustrates the arrangement of the structure of the invention with respect to a substrate.

In accordance with FIG. 1, lamps 2 and 3 are shown with lamp 2 is indicated as being on the other side. When viewing the present invention in FIG. 2, the light from the line filament of the first lamp 2 strikes the first surface mirror 5 and reflects light at a 90° angle. For an example, the existing light is shown to be perpendicular. Looking at the first mirror 5 from position 6, it is possible to see a reflected image of about 3 inches of the line filament of the first lamp 2. The ends of the lamp, including the mounting clips and wiring are not reflected since the mirror is shorter than the lamp. The second mirror 4 is cemented to the opposite side of the angle but in end-to-end relationship with the first mirror 5.

The aforementioned describes but one of a multiplicity of the structure elements employed in the present invention depending upon the number of photo detectors required. In this sense a multiple number of photo detectors provide full coverage to the substrate. Thus, the number varies with the width of substrate.

To form a continuous line of light, the first surface mirror 5 must be shorter than the length of the usable part of the lamp filament 2. A suitable lamp employed in a prototype of the present invention was found to be a CHICAGO MINIATURE LAMP COMPANY lamp CM8-1126. The lamp filament was about 3 ¼ inches long such that the length of the mirror was 3 inches.

The mirrors are cemented to a structure such as an aluminum angle 7 and thereby angled at about 90° with respect to one another and at 45° with respect to the angle of the optical path of the lamp. It has been found that the lamps if staggered along the length of the angle structure 7 with lamps 1,3, etc. on one side and lamps 2,8, etc. on the other side provide a satisfactory arrangement.

The second lamp 1 is mounted on the opposite side of the angle from the first lamp, such that its filament is in line with the second mirror 4. It follows that with both lamps operating and when viewing the mirrors from position 6, it is possible to see a reflected image of a filament that appears to be 6 inches long, which in fact is comprised of two 3-inch segments.

The present invention contemplates that there are about 14 lamps and 14 mirrors forming a continuous line of light approximately 42 inches in length. First surface mirrors or front surface as they are often called, are used to reflect the line of light because when the mirror finish is on the back surface, there are generally two reflections instead of one. One reflection is caused by the mirrors silver surface and the weaker, secondary refection is caused by the front surface of the glass. On this particular application the mirrors are 3 inches × three-fourths inch. According to FIG. 3 infra-red light 29 transmitted through the film 28 being inspected impinges on window of photo transistor 30. The light source 27 is shown in more detail in FIGS. 1 and 2. As long as there are zero defects in the film 28, a constant level of light will impinge on transistor 30 without any further circuit activity. If a defect is sensed, the photo transistor 30 receives more or less light instantaneously.

With such an occurance, the output of the voltage follower 31 varies in proportion to the change in light. With a constant level of light into the photo transistor 30 there is a corresponding constant voltage at point 32, therefore, at the output of the voltage follower. A resistor 33 is in series circuit relation with photo transistor 30 as well as connected to voltage follower 31 provides a load resistance for the photo transistor 30.

For example, the voltage at 32 will be 7.5 volts and the value of resistance 33 is chosen accordingly, for example 22 K. As is well known, the voltage follower 31 serves to lower the output impedance of the circuit and enable the use of long length of cable or wire without electrical interference. A capacitor 34 serves as a damping capacitor to the voltage follower 31. A second capacitor 35 is a band pass capacitor eliminating unwanted high frequency noise. At point 35 a d.c. level exists, i.e. input voltage and voltage are identical. A capacitor 37 in series with the voltage follower 31 serves to block the d.c. voltage to travel further in the circuit. The change in voltage occurs only in response to a change in light. At this point the electrical signal reflects the value of the light signal change.

A standard operational amplifier circuit 38 with a voltage gain of 100 is connected in series to capacitor 37 in a conventional manner. A diode 39 in series with amplifier 38 prevents interaction between multiple circuits of a similar type which are connected in parallel. The signal output 40 is sent to a suitable recording device i.e. chart recorder or digital interface for signal processing. In this connection a defect so sensed could cause the machine to cease its forward motion to defective provide.

Additional embodiments may be employed and are connected in parallel with one another at point 40.

A typical circuit illustrating the specific structure purely for exemplary purposes is shown in FIG. 3. According to this diagram the schematic representation is shown as a typical one channel photo detector and signal amplifier used with the continuous line of light. The instant invention employs about 84 photo detectors E for photo detection in the arrangement described hereinbefore and this number is indicated purely for illustrative purposes. The multiplicity of photo detectors is spaced about 1 inch apart across the width of the entire film line that is being inspected. Such an arrangement in combination with one another is used in the manner previously described to carry out the line of light concept as hereinbefore described.

While the invention has been disclosed in conjunction with certain particular embodiments, it is not confined to the details of construction herein set forth and this application is intended to cover such departures or modified arrangements as may come within the purposes of the improvements or the scope of the following claims:

What I claim is:

1. An infrared radiance measuring apparatus adapted to measure the transmissivity of a moving substrate with infrared radiance, employing a series of line filament lamps, the infrared radiance from said lamps modulates in response to defects in the substrate being monitored, wherein: each of said lamps is in cooperative relationship with front surface mirrors, being alternately mounted with respect to said lamps at 45° forming a continuous line of light of a length equal to the width of said moving substrate.

2. An infrared radiance measuring apparatus as claimed in claim 1, including: a plurality of single channel photo detectors and signal amplifiers connected in parallel with respect to one another, for multiple arrays, at the point of output of each of said respective signal amplifiers.

3. An infrared radiance measuring apparatus as claimed in claim 1 wherein: an alternate array of lamps and mirrors is in circuit relationship with a plurality one-channel photo detector and signal amplifiers, said photo detectors being responsive to light impinging thereon, as said substrate of moving material passes between said detectors and said source of light; enabling an instantaneous change in voltage to be measured electrically in response to an instantaneous change of light caused by a defect in said substrate.

4. An apparatus as claimed in claim 1, wherein: resistance means are provided in series relationship with said plurality of photo detectors as a load resistance means and capacitive means are provided for limiting bandpass and for direct current blocking; blocking circuit means in a series relationship with each output amplifier means coupled to its respective diode to eliminate interaction between multiple circuits of a similar type, which circuits are connected in parallelism to one another.

* * * * *